United States Patent [19]
Pergament

[11] 3,742,996
[45] July 3, 1973

[54] ANTI-SKID DEVICE FOR AUTOMOBILES
[76] Inventor: Henry Pergament, Hawley Road, North Salem, N.Y. 10560
[22] Filed: Aug. 30, 1971
[21] Appl. No.: 175,817

[52] U.S. Cl. .............................................. 152/225
[51] Int. Cl. ......................................... B60c 27/20
[58] Field of Search .......................... 152/225, 226

[56] References Cited
UNITED STATES PATENTS

| | | | |
|---|---|---|---|
| 3,122,192 | 2/1964 | Seidell | 152/225 |
| 3,151,654 | 10/1964 | Minutillo | 152/225 |
| 3,437,121 | 4/1969 | Strapko et al. | 152/225 |

*Primary Examiner*—James B. Marbert
*Attorney*—Walter G. Weissenberger

[57] ABSTRACT

An anti-skid device for use in mounting on a vehicle wheel comprises a body member having three stationary arms, a first arm containing a slidably telescoping rod member having a first series of teeth; a locking assembly mounted on the first arm comprising a trigger means having a second series of teeth for meshing into the first series of teeth; and the anti-skid device being self-adjusting and self-locking unidirectionally for telescoping movement of the rod member in the direction of securely gripping the wheel.

5 Claims, 4 Drawing Figures

PATENTED JUL 3 1973

3,742,996

INVENTOR
HENRY PERGAMENT
BY
Hammond + Littell
ATTORNEYS

ANTI-SKID DEVICE FOR AUTOMOBILES

BACKGROUND OF THE INVENTION

This invention relates to anti-skid devices of the type for use in connection with vehicle wheels.

In the prior art relating to structures of this general nature, there have been numerous devices adopted for attachment to vehicle wheels to provide traction in snow or mud or on icy surfaces. However, these structures have not been particularly easy to mount on the wheels until the wheels were raised off the ground; nor have these structures been readily adjustable to the variations in wheel size. In U. S. Pat. No. 2,456,544 to Varner it is known to provide a locking device for a telescoping tire clamp member, in which the locking device comprises a lever link to engage a bayonet slot when activated by the lever bar movable in a plane transverse to the plane of the tire. This prevents any further movement of the member until it is unlocked by the lever bar. Thus no adjustment can occur. Also, in U. S. Pat. No. 2,510,451 to Williams et al. it is known to provide a locking device comprising in part a lever mechanism also transverse to the plane of the tire which further includes a connecting member for adjusting the length of the wheel gripping arm. However, this adjustment feature may permit the loosening of the gripping arm under certain circumstances where the tire becomes deflated due to a slow air leak or because of a puncture producing a more rapid air leak. Thus no adjustment can occur while the vehicle is in motion.

OBJECTS OF THE INVENTION

It is therefore an object of the present invention to provide an anti-skid device for a vehicle tire that is self-adjusting and self-locking while the vehicle is in motion to prevent loosening of its effective grip upon the wheel if the wheel becomes deflated.

It is a further object of the present invention to provide an anti-skid device comprising a slidably telescoping rod member having a first series of teeth over its length and housed in a first arm in combination with a locking assembly on said first arm comprising a trigger means having a second series of teeth for meshing into the first series of teeth to prevent movement of the rod member in the extension direction out of the first arm while simultaneously permitting movement of the rod member in the compression direction to securely grip the wheel.

Other and further objects of the present invention will become apparent as the description thereof proceeds.

DESCRIPTION OF THE INVENTION

The present invention is directed to an anti-skid device for use in being mounted onto a vehicle wheel, comprising a body member having three stationary arms in a plane parallel to the plane of the wheel, each of said arms having an extension thereon for gripping said wheel; a locking assembly mounted on a first arm of said three arms and positioned parallel to the plane of the wheel and positioned to cover an opening in the wall of said first arm, said first arm comprising a hollow shaft housing a slidably telescoping rod member having a first series of teeth over substantially all of the length of said telescoping rod member; said locking assembly comprising a trigger means having a second series of corresponding teeth for meshing into the said first series of teeth; said first series of teeth and said second series of teeth being constructed and arranged to prevent movement of the rod member in the extension direction out of the first arm while simultaneously permitting movement of the rod member in the opposite direction into the arm; said anti-skid device thereby being self-adjusting, self-tightening and self-locking unidirectionally for telescoping movement of the rod member in the direction of securely gripping said wheel.

Referring now to the several views of the drawings, the invention will be explained in detail.

Figure 1:
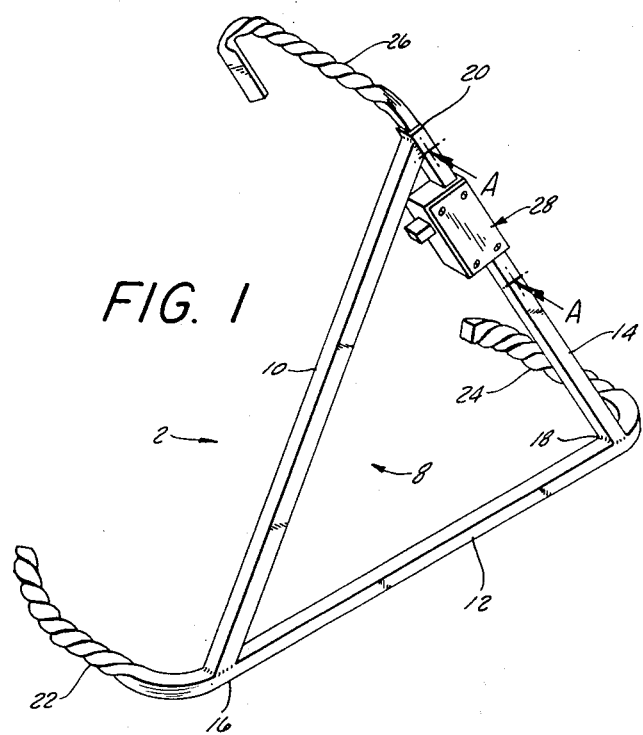
FIG. 1 is a perspective view of the anti-skid device.
Figure 2:
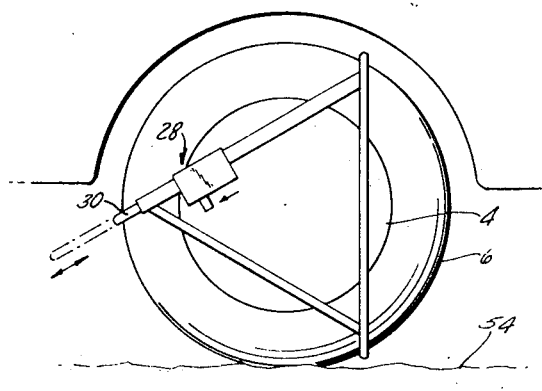
FIG. 2 is a view of the anti-skid device having been expanded and placed on a tire.
Figure 3:
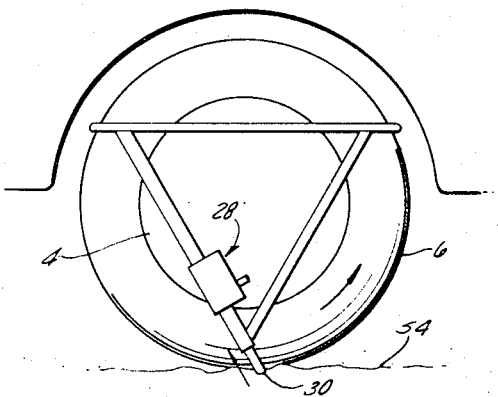
FIG. 3 is a view of the anti-skid device being tightened by rotation of a tire.

In FIG. 1 general reference numeral 2 indicates an anti-skid device shown in FIGS. 2 and 3 as mounted on a conventional automobile wheel 4 carrying a conventional pneumatic tire 6. A device of this nature is applied to the drive wheels, generally the rear wheels of an automobile, when the vehicle must travel through deep snow, soft mud, or on icy surfaces, and is intended to give suitable traction to the wheels when traveling is difficult.

Anti-skid device 2 comprises a body member 8 having three rigid stationary metal arms 10, 12 and 14 made of steel, for example, in a plane parallel to the plane of the wheel. These three arms are connected to form an equilateral triangle, for example, by being welded to each other only at the vertices thereof at points 16, 18 and 20. Each arm may project a short distance past the vertex, whereupon an extension means 22, 24 or 26 is attached thereto, either by welding or by being a further extension of its respective arm. The extension means on each arm is curved to fit around the width or rolling surface of the wheel and tire and have a straight central area, plus being of a twisted outer surface not only to grip the wheel but also to provide tractional friction with the ground.

Figure 4:
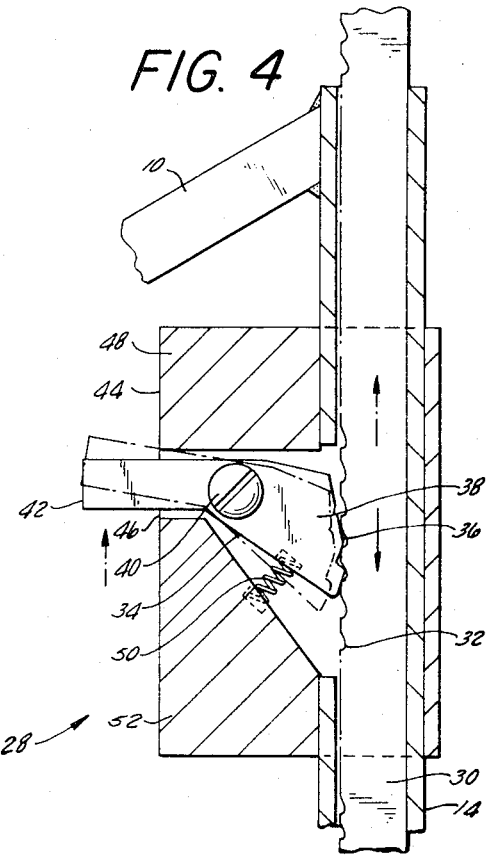
FIG. 4 is an enlarged view of the locking assembly along section lines A—A.

Mounted upon arm 14 is the locking assembly designated as 28, which is more fully shown by FIG. 4. Arm 14 further comprises a hollow shaft housing a slidably telescoping rod member 30 having a first series of teeth 32 over substantially all of the length of this telescoping rod. Locking assembly 28 is mounted on arm 14 and positioned to lay in or to be parallel to the plane of the wheel, and is positioned to cover an opening in the wall of arm 14 provided for this purpose. Attachment of assembly 28 may be accomplished for example by welding thereto.

The locking assembly 28 is constructed of a rigid metal such as steel and includes a trigger means 34 having a second series of corresponding teeth 36 for meshing into the said first series of teeth. The teeth are cut into the head portion 38 which is located between telescoping rod 30 and pivot 40 about which trigger means 34 can rotate in a fixed plane parallel to the plane of the wheel. This pivot also fastens the trigger to the locking assembly. On the side of the pivot opposite to head 38 is an extended body portion 42 that extends outward past the side wall 44 through an opening 46 therein of the locking assembly to be engaged by the operator of the anti-skid device, as will now be explained.

When the end of the extended body portion of the trigger means is raised upward away from the ground, as shown in FIG. 4, the head of the trigger moves downward a sufficient distance to disengage its teeth from the corresponding teeth on the telescoping rod to permit movement of the rod both into and out of its housing 14. At this point the rod could be either fully inserted into the housing or extended sufficiently to fit around the vehicle's wheel, as shown in FIG. 2.

The upward movement of extension 42 is limited by the upper block 48 which is spaced closely to and parallel with the body portion 42 as shown. By limiting this upward movement of the body portion, the downward movement of the head portion is correspondingly limited.

At this point the end 42 is released; and compressed spring means 50 attached from below, to the head, urges the head 38 and teeth 36 upward into engagement with teeth 32. The other end of spring 50 is attached into lower block 52.

The operator of the anti-skid device could then push the extension 26 snugly against the wheel without releasing the telescoping rod by means of trigger means 34. This is because the compressed spring 50 provides a threshold resistance for rigidly maintaining the head portion 38 in stationary contact with the rod 30 until this threshold resistance is overcome by a compression force directed down the length of the telescoping rod member.

It is to be noted that a unique feature of this invention is that while the rod 30 can be pushed into the housing without the use of the trigger to release the rod, the rod 30 cannot be pulled in the opposite direction out of the housing unless the extended body portion 42 is raised upward. This feature results from the fact that head portion 38 is bent angularly downward through 5° to 10° from the horizontal.

This arrangement of features prevents movement of the telescoping rod member in a direction that extends it out of the housing, whereby the anti-skid device could not properly grip the wheel. However, this arrangement of features simultaneously permits movement of the rod member in a direction that compresses it into the housing, so as to assure very adequate grippage of the wheel.

If, for example, the tire were to lose air pressure and thereby become of diminished diameter, the anti-skid device would automatically adjust itself to this new diameter based upon the rolling motion of the vehicle which would position the extension 26 between the wheel and ground 54 and by means of the weight of the vehicle force the rod 30 further into its housing until a tight grip of the wheel were again achieved as shown in FIG. 3. Thus the anti-skid device is self-adjusting, self-tightening for safety purposes, and self-locking unidirectionally for telescoping movement of the rod member in the direction of securely gripping the tire and the wheel even if the tire were to become deflated while the vehicle is in motion.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

I claim:

1. An anti-skid device for use in being mounted onto a vehicle tire and wheel, comprising a body member having three stationary arms in a plane parallel to the plane of the wheel, each of said arms having an extension thereon for gripping said wheel; a locking assembly mounted on a first arm of said three arms and positioned parallel to the plane of the wheel and positioned to cover an opening in the wall of said first arm, said first arm comprising a hollow shaft housing a slidably telescoping rod member having a first series of teeth over substantially all of the length of said telescoping rod member; said locking assembly comprising a trigger means having a second series of corresponding teeth for meshing into the said first series of teeth, said first series of teeth and said second series of teeth being constructed and arranged to prevent movement of the rod member in the extension direction out of the first arm while simultaneously permitting movement of the rod member in the compression direction, said trigger means further comprising a pivot means for fastening said trigger to said locking assembly, a head portion on one side of said pivot and adjacent to said first series of teeth for engagement therewith, an extended body portion on the opposite side of said pivot for movement of the head portion of said trigger means around said pivot; said locking assembly further comprising an upper block for limiting the downward movement of said head portion when said body portion is raised upwards, a lower block beneath said trigger means, and a compressed spring positioned between said lower block and said head portion for urging said head and second series of teeth into engagement with said first series of teeth, said compressed spring providing a threshold resistance for rigidly maintaining the head portion in contact with said telescoping rod member until said threshold resistance is overcome thus permitting movement of the rod member only into the housing; said anti-skid device thereby being self-adjusting, self-tightening and self-locking unidirectionally for telescoping movement of the rod member in the direction of securely gripping said wheel.

2. The anti-skid device of claim 1 in which the three arms form an equilateral triangle connected to each other only at the vertices thereof.

3. The anti-skid device of claim 2 in which the respective extension of each arm is placed adjacent to a vertex of said triangle.

4. The anti-skid device of claim 3 in which the extension on each arm is curved to fit around the width of the wheel and is of a twisted outer surface to not only grip said wheel but also to provide tractional friction with the ground.

5. The anti-skid device of claim 4 in which the head portion is bent angularly downward through 5° to 10° from the horizontal.

* * * * *